(12) United States Patent
Miyamoto

(10) Patent No.: US 8,537,565 B2
(45) Date of Patent: Sep. 17, 2013

(54) ELECTRONIC CONTROL UNIT-MOUNTING ELECTRIC JUNCTION BOX

(75) Inventor: Takashi Miyamoto, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 120 days.

(21) Appl. No.: 13/143,625

(22) PCT Filed: Aug. 19, 2009

(86) PCT No.: PCT/JP2009/003948
§ 371 (c)(1),
(2), (4) Date: Jul. 7, 2011

(87) PCT Pub. No.: WO2010/092633
PCT Pub. Date: Aug. 19, 2010

(65) Prior Publication Data
US 2011/0267786 A1    Nov. 3, 2011

(30) Foreign Application Priority Data

Feb. 16, 2009   (JP) .................................. 2009-032688

(51) Int. Cl.
*H05K 7/02* (2006.01)
(52) U.S. Cl.
USPC ...... 361/807; 361/679.01; 361/809; 361/748; 361/752; 174/50; 174/520; 174/534; 174/541; 439/76.2
(58) Field of Classification Search
USPC ................... 361/752, 748, 679.01, 807, 809; 174/50, 520, 535, 541; 439/76.2
See application file for complete search history.

(56) References Cited

U.S. PATENT DOCUMENTS

| | | | | |
|---|---|---|---|---|
| 6,560,115 B1 * | 5/2003 | Wakabayashi et al. | ........ | 361/728 |
| 6,690,582 B2 * | 2/2004 | Sumida | .......................... | 361/752 |
| 8,339,801 B2 * | 12/2012 | Tominaga et al. | ............ | 361/775 |
| 2001/0021103 A1 * | 9/2001 | Takagi | ........................... | 361/752 |

FOREIGN PATENT DOCUMENTS

| | | |
|---|---|---|
| JP | A-10-174253 | 6/1998 |
| JP | A-2000-306636 | 11/2000 |
| JP | A-2002-58134 | 2/2002 |
| JP | A-2004-48969 | 2/2004 |
| JP | A-2007-282385 | 10/2007 |

OTHER PUBLICATIONS

International Search Report in International Application No. PCT/JP2009/0039481; dated Sep. 15, 2009 (with English translation).

* cited by examiner

*Primary Examiner* — Angel R Estrada
*Assistant Examiner* — Dimary Lopez
(74) *Attorney, Agent, or Firm* — Oliff & Berridge, PLC

(57) ABSTRACT

An electronic control unit-mounting electric junction box having a versatile structure configured to accommodate both external and built-in electronic control units. The junction box includes an external upper case that forms the mounting space of an electronic control unit by means of a recessed containing section opening to the outer surface of a case, and a built-in upper case that internally forms the mounting space of an electronic control unit by raising outward the bottom wall of the recessed containing section in the external upper case are standardized in a basic section with the position of the bottom wall excluded, and a lower case and a conducting path that are combined with the external upper case and the built-in upper case are standardized.

3 Claims, 4 Drawing Sheets

ELECTRONIC CONTROL UNIT-MOUNTING ELECTRIC JUNCTION BOX

This application is a national phase application of PCT/JP2009/003948, filed Aug. 19, 2009, and claims priority to JP2009-032688, filed in Japan on Feb. 16, 2009, the entire disclosures of which are hereby incorporated by reference in their entireties.

BACKGROUND

This disclosure generally relates to an electronic control unit-mounting electric junction box used for vehicles and the like, and more particularly, to an attachment structure of an electronic control unit.

Electric junction boxes, such as fuse boxes, relay boxes, and junction boxes, have been used for electric wiring of vehicles. An electric junction box generally has a conducting path in a casing formed of a lower case and an upper case, and is configured to electrically connect circuits and electronic parts of an electronic control unit to respective external wires via the conducting path in a junction box main body.

Incidentally, electric junction boxes are largely classified into two types: (1) an external type having an electronic control unit attached to the outside of the upper case as is disclosed in, for example, JP-A-10-174253, and (2) a built-in type having an electronic control unit attached to the inside of the upper case as disclosed in, for example, JP-A-2002-58134.

For example, regarding a printed-wiring board forming the electronic control unit, when electronic control units are prepared to specifications at a particular place of destination, such as types and grades of vehicles, there are some cases where it is also preferable to prepare respective printed-wiring boards at the place of destination. In particular, because automobiles for oversea use have specifications that vary from country to country, such as horsepower control, fuel consumption control, and emission control, electronic control units manufactured by local manufacturers in the respective countries may be attached in some cases.

It is desirable to also manufacture the electric junction boxes at the same place of destination as that of the electronic control units. However, considering the characteristics of a standardized circuit, it is advantageous to centralize the manufacturing at one place in terms of cost, such as facility investment. Electric junction boxes and electronic control units are therefore manufactured at different places in some cases and when electric junction boxes and electronic control units are put together, it becomes necessary to transport one of the former and latter parts to the place of manufacture of the other. Hence, when electronic control units are transported to the place of manufacture of electric junction boxes, printed-wiring boards having mounted electronic parts are contained in special cases to safeguard the printed-wiring boards against impact and the like during transportation. Further, so that a worker at the place of manufacture of electric junction boxes is able to easily attach the printed-wiring board while the printed-wiring board is contained in the special case, a connector section to be connected to the electric junction box is provided to the case. Conversely, in a case where electric junction boxes are transported to the place of manufacture of electronic control units, work man-hours are increased by removing the casing of an electric junction box and then connecting the printed-wiring board of the electronic control unit to the conducting path. It is therefore preferable to use an electric junction box of the type having an external electronic control unit when the place of manufacture of electric junction boxes is different from the place where electronic control units are attached.

In contrast, when electric junction boxes and electronic control units can be prepared and assembled at the same location, there is no need to transport the electronic control units from one place to another, and it is no longer necessary to contain the printed-wiring boards in the special cases. Accordingly, allowing the printed-wiring board to be contained between the lower case and the upper case, and connecting the printed-wiring board to the conducting path in the electric junction box without mediation of the special case can reduce the number of parts. Further, connectors become unnecessary as a result of the soldering the conducting path to the printed-wiring board. Thus, the number of parts can be further reduced. In such a case, it is preferable to use electric junction boxes of the type having a built-in electronic control unit.

However, when electric junction boxes attached with electronic control units are manufactured, it is preferable to complete an electronic control unit-mounting electric junction box to which attachment of the electronic control unit is completed in a place close to a wire harness assembly line or a manufacturing line of an automobile manufacturer in terms of a reduction of a manufacturing tact time and a transportation charge. As a result, both the situation where the external type is suitably used because electronic control units and electric junction boxes are manufactured at different places, and the situation where the built-in type is suitably used because the former and the latter are manufactured at the same place, may coexist in some cases.

Hence, even when consideration is given to whether the location of assembly of the electric junction boxes and electronic control units is different from, or same as, the place where the electronic control units are prepared in advance, it is necessary to prepare electric junction boxes of both the external type and the built-in type in the related art, thereby resulting in an increase of the manufacturing costs and intricacy of parts management

SUMMARY

The exemplary embodiments are directed to an electronic control unit-mounting electric junction box having a versatile structure configured to accommodate both external and built-in electronic control units.

Hereinafter, description of the exemplary embodiments will be described. The exemplary embodiments described herein in detail are for illustrative purposes and are subject to many variations in structure and design, and may be combined. It should be emphasized, however, that the present disclosure is not limited to a particularly disclosed embodiment shown or described. It is understood that various omissions and substitutions of equivalents are contemplated as circumstances may suggest or render expedient, but these are intended to cover the application or implementation without departing from the spirit or scope of the claims.

That is, the exemplary embodiments have an electronic control unit-mounting electric junction box including an electronic control unit attached to an electric junction box main body provided with a conducting path in a casing formed by combining a lower case and an upper case, the electronic control unit being connected to the conducting path in the electric junction box main body, an external upper case provided with an attachment space of the electronic control unit to the electric junction box main body by a recessed containing section opening in an outer surface of the upper case and a built-in upper case provided inside with an attachment space of the electronic control unit by raising a bottom wall of the recessed containing section of the external upper case outward are standardized in a basic section except for a position of the bottom wall of the recessed containing section, and the lower case and the conducting path that are combined with the external upper case and the built-in upper case are standardized, so that both an external electronic control unit having a housing and a built-in electronic control unit having no housing are made attachable by selectively adopting the external upper case and the built-in upper case in the electric junction box main body.

Further, in a case where the external electronic control unit is to be attached, the external upper case is selected and combined whereas in a case where the built-in electronic control unit is to be attached, the built-in upper case is selected and combined. It thus becomes possible to use the standardized lower case and conducting path for both the external and built-in electronic control units. Hence, not only can the manufacturing costs be reduced, but also intricacy of parts management can be lessened. In the exemplary embodiments, the external upper case and the built-in upper case are also standardized in the basic section. It is therefore possible to use the same molding die for the standardized portion. The manufacturing costs can be thus reduced further.

Also, because the electronic control unit-mounting electric junction box of the exemplary embodiments is capable of accommodating both the external and built-in electronic control units, for example, when electronic control unit-mounting electric junction boxes having specifications that vary from country to country are manufactured, it becomes possible to obtain the electronic control units in a country concerned by adopting the external type. Even when the electric junction boxes are manufactured other than this country, the electronic control units and the electric junction boxes can be put together. Also, by adopting the built-in type, it becomes possible to put the electronic control units and the electric junction boxes together at the same place. Hence, by arbitrarily selecting an electronic control unit of the external type or the built-in type according to the place where the electronic control unit-mounting electric junction box is to be completed finally, contribution can be made to a reduction of the transportation charge and the manufacturing tact time.

In the exemplary embodiments, at least one external upper case and one built-in upper case are prepared. However, it should be appreciated that a plurality of upper cases having the raising dimension set in a plurality of steps may be prepared. The number of boards in the electronic control unit to be connected to the electric junction box of the invention is not particularly limited, either. For example, in a case where one board is to be contained, a built-in upper case having a small raising dimension may be selected whereas in a case where two or more boards are to be contained, a built-in upper case having a larger raising dimension may be selected. When configured in this manner, an appropriate upper case can be combined according to the number of boards to be attached. It thus becomes possible to achieve a size reduction and high-density arrangement of the electric junction box and more reliable attachment of the electronic control unit.

Also, the exemplary embodiments may be configured such that the external upper case and the built-in upper case are manufactured using a same base molding die and a die of an insert structure is adopted for a molding section of the bottom wall of the recessed containing section in the molding die of the external upper case, so that raising of the bottom wall of the recessed containing section is set by selecting the insert die. When configured in this manner, not only does it become possible to manufacture a large number of upper cases for which the raising dimension is set in a plurality of steps cost-efficiently with ease, but also it becomes possible to minimize modification of the dies.

DETAILED DESCRIPTION OF EXEMPLARY EMBODIMENTS

Description of the exemplary embodiments will be described in detail with reference to the drawings.

Figure 1:
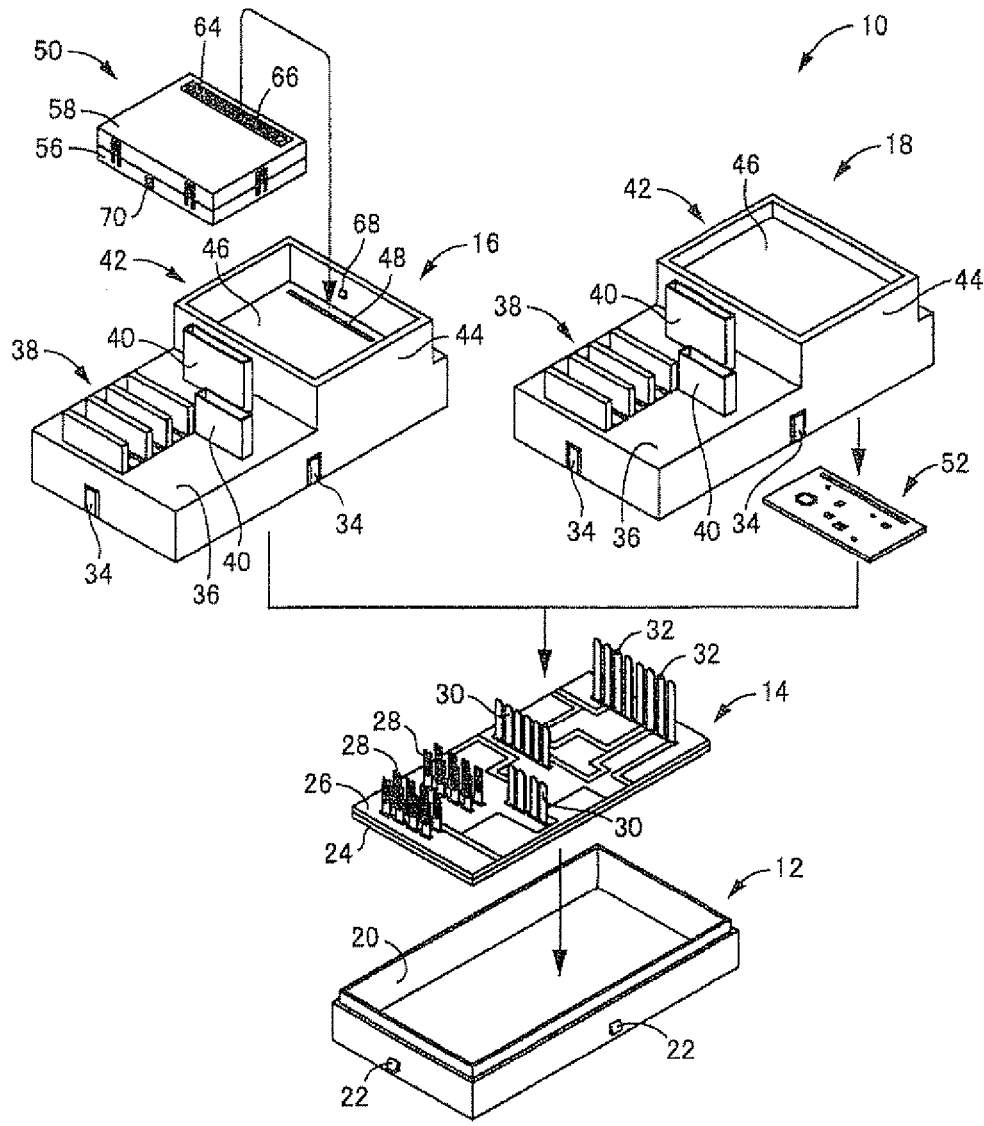
FIG. 1 is a view used to schematically describe an electric junction box of an exemplary embodiment.

FIG. 1 schematically shows the entire configuration of a fuse box 10 as an electronic control unit-mounting electric junction box according to an exemplary embodiment. The fuse box 10 includes a lower case 12, a bus bar laminated body 14, and an external upper case 16 and a built-in upper case 18 as an upper case to be combined with the lower case 12 and the bus bar laminated body 14. In the description below, the term, "top-bottom direction", means the top-bottom direction of FIG. 1 unless specified otherwise.

More specifically, the lower case 12 is an injection molded body made of synthetic resin and shaped substantially like a box opening upward. Stopping claws 22 are provided to the outer circumferential surface of the lower case 12 so as to protrude therefrom. Although it is not shown in the drawing, a through-hole is provided to the bottom wall of the lower case 12 when the need arises and a tab protruding downward from the bus bar laminated boy 14 protrudes in an external space under the lower case 12 via the through-hole.

Meanwhile, the bus bar laminated body 14 has a laminated structure in which a plurality of bus bars 26 as a conducting path are laminated via insulating plates 24 and a plate-shaped tab formed of the bus bars 26 is provided so as to protrude upward or downward. Particularly, in the exemplary embodiments, fuse connecting tabs 28, connector connecting tabs 30, electronic control unit connecting tabs 32 and the like are provided to the bus bar laminated body 14 so as to protrude upward. The bus bar laminated body 14 is contained in the lower case 12. The bus bar laminated body 14 is an internal circuit formed by combining the bus bars 26 and the insulating plates 24. However, the configuration of this internal circuit can be an arbitrary combination of wires (covered wires, naked wires and the like), flexible printed-wiring boards, and rigid printed-wiring boards by means of interconnection by press-fit terminals, solderless terminals, or welding.

The external upper case 16 and the built-in upper case 18 are selectively attached to the lower case 12 containing the bus bar laminated body 14. The external upper case 16 and the built-in upper case 18 have substantially the same structure in the basic section except for a bottom wall 46 of a recessed containing section 42 described below. Hence, the external upper case 16 will be described below by way of example and a description of the built-in upper case 18 for the sections same as those of the external upper case 16 is omitted by labeling the same reference numerals in the drawings.

The external upper case 16 is an injection molded body made of synthetic resin and shaped substantially like a box opening downward. The external upper case 16 is formed one size larger than the lower case 12 and provided with engaging recessed sections 34 opening in the inner surface of the external upper case 16 at positions corresponding to the stopping claws 22 of the lower case 12. As the external upper case 16 is placed to cover the lower case 12 and the stopping claws 22 of the lower case 12 are engaged with the engaging recessed sections 34 of the external upper case 16, the external upper case 16 is locked and fixed to the lower case 12.

A fuse attaching section 38, connector attaching sections 40, and the like are formed integrally with a top wall 36 of the external upper case 16. The fuse connecting tabs 28 of the bus bar laminated body 14 protrude inside the fuse attaching section 38 and the connector connecting tabs 30 protrude inside the connector attaching sections 40. As a fuse (not shown) is attached to the fuse attaching section 38, the fuse connecting tabs 28 are connected to the fuse. Meanwhile, as a connector (not shown), such as a wire harness, is connected to the connector attaching sections 40, the connector connecting tabs 30 are electrically connected to the external wires.

Further, the recessed containing section 42 opening in the case outer surface is formed integrally with the external upper case 16. The recessed containing section 42 is a rectangular recessed section surrounded by a peripheral wall 44 protruding upward from the top wall 36 and opening upward, which is an outward direction of the case, and formed in a size large enough to contain a typical external electronic control unit 50 (described below). A tab insertion hole 48 is provided to the bottom wall 46 of the recessed containing section 42 so as to penetrate therethrough in the thickness direction. Particularly, in the exemplary embodiments, the bottom wall 46 is formed on substantially the same plane as the top wall 36 of the external upper case 16.

Meanwhile, the built-in upper case 18 has a standardized structure same as the one in the external upper case 16 in the basic section except that the bottom wall 46 of the recessed containing section 42 in the external upper case 16 is raised upward (i.e., an outward direction of the case).

The external upper case 16 and the built-in upper case 18 can be combined with the standardized lower case 12 and bus bar laminated body 14. The external upper case 16 is selected and used in a case where an external electronic control unit 50 is to be attached to the lower case 12 containing the bus bar laminated body 14 whereas the built-in upper case 18 is selected and used in a case where a built-in electronic control unit 52 is to be attached to the lower case 12.

Figure 2:
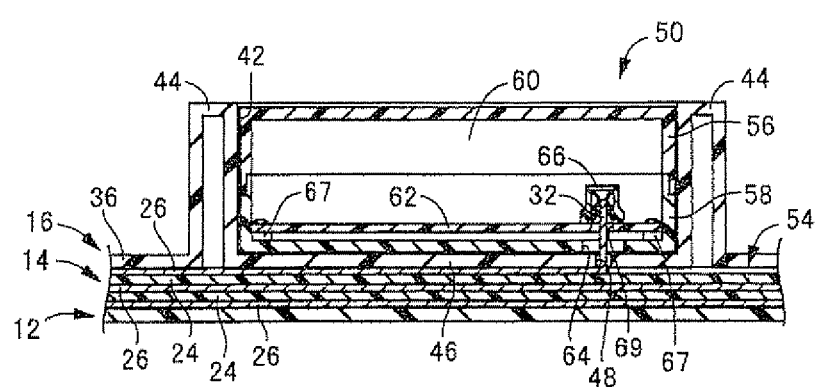
FIG. 2 is an explanatory cross section used to describe an attached state of an electronic control unit using an external upper case.

FIG. 2 shows an attached state of the external electronic control unit 50 using, for example, the external upper case 16. As is shown in FIG. 2, as the external upper case 16 is placed to cover the lower case 12, a casing 54 as an internal void is defined between the external upper case 16 and the lower case 12 and the bus bar laminated body 14 is contained in this casing 54. The respective tabs protruding upward from the bus bar laminated body 14 protrude to the external of the casing 54 via the through-hole provided to the top wall 36 of the external upper case 16. In particular, the electronic control unit connecting tabs 32 protrude inside the recessed containing section 42 through the tab insertion hole 48 provided to the bottom wall 46 of the recessed containing section 42. In a case where the external upper case 16 is selected and combined in this manner, the electric junction box main body includes the lower case 12, the bus bar laminated body 14, and the external upper case 16.

In the electric junction box main body in which the external upper case 16 is selected and combined, an attachment space for electronic control unit is formed by the recessed containing section 42 on the outside of the external upper case 16 and the external electronic control unit 50 is attached to the recessed containing section 42.

The external electronic control unit 50 has a structure in which a printed-wiring board 62 provided with various electronic parts and printed wiring is contained in a housing 60 formed by combining an upper case 56 and a lower case 58. A connector connecting hole 64 is provided to penetrate through the lower case 58. Also, a connector 66 is provided to one of the surfaces of the printed-wiring board 62 and a tab through-hole 69 is provided to the other surface at a position opposing the connector connecting hole 64. The printed-wiring board 62 is, for example, fastened to a boss 67 provided to protrude from the lower case 58 with screws and thereby supported inside the housing 60. A stopping claw 68 (see FIG. 1) is formed at a predetermined position on the inner surface of the peripheral wall 44 of the recessed containing section 42 and when the stopping claw 68 is engaged with an engaging recessed section 70 (see FIG. 1) provided to the upper case 56, the external electronic control unit 50 can be fixed in a state contained in the recessed containing section 42.

As the external electronic control unit 50 having the structure as above is contained in the recessed containing section 42, the electronic control unit connecting tabs 32 protruding inside the recessed containing section 42 are inserted into the connector 66 provided to the printed-wiring board 62 through the connector connecting hole 64. Accordingly, the bus bars 26 and the printed wiring provided to the printed-wiring board 62 are electrically connected to each other and respective electronic parts provided to the printed-wiring board 62 become electrically connectable to the external wires via the bus bars 26.

Figure 3:
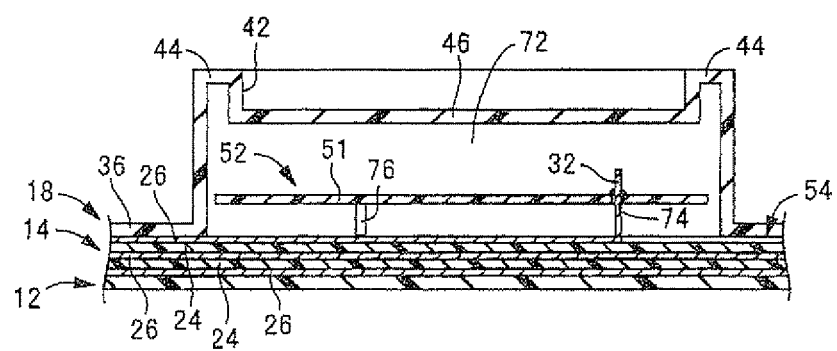
FIG. 3 is an explanatory cross section used to describe an attached state of an electronic control unit using a built-in upper case.

Meanwhile, FIG. 3 shows an attached state of the built-in electronic control unit 52 using the built-in upper case 18 by a model. In a case where the built-in electronic control unit 52 is attached, the electric junction box main body includes the lower case 12, the bus bar laminated body 14, and the built-in upper case 18. As the bottom wall 46 of the recessed containing section 42 of the built-in upper case 18 is raised, a containing void 72 as an attachment space for electronic control unit is defined in a region surrounded by the peripheral wall 44 and the bottom wall 46 in the casing 54, which is on the inside of the built-in upper case 18. The electronic control unit connecting tabs 32 and the built-in electronic control unit 52 are contained in this containing void 72.

Unlike the external electronic control unit 50, the built-in electronic control unit 52 is not protected by the upper and lower cases 56 and 58 and it is formed of a printed-wiring board 51 having no housing 60. Respective electronic parts and printed wiring provided to the printed-wiring board 51 are therefore exposed to the external.

As the electronic control unit connecting tabs 32 are inserted into a through-hole 74 provided to penetrate through the printed-wiring board 51 as the built-in electronic control unit 52 and soldered to the printed-wiring board 51, the built-in electronic control unit 52 is attached to the electric junction box main body in a built-in state in the containing void 72. Accordingly, the bus bars 26 and the printed-wiring board 51 are electrically connected to each other and respective electronic parts provided to the built-in electronic control unit 52 become electrically connectable to the external wires via the bus bars 26. In a case where the electronic control unit connecting tabs 32 are installed along the outer circumference of the printed-wiring board 51 entirely or on kitty-cornered two sides, the built-in electronic control unit 52 can achieve not only electrical connection but also mechanical connection when soldered to the electronic control unit connecting tabs 32. In a case where there are fewer installation points for the electronic control unit connecting tabs 32 to be soldered, it is preferable to support the printed-wiring board 51 additionally by a supporting protrusion 76 or the like provided at an arbitrary place of the insulating plate 24 of the bus bar laminated body 14.

According to the fuse box 10 having the above structure, both the external electronic control unit 50 and the built-in electronic control unit 52 can be attached thereto using the standardized lower case 12 and bus bar laminated body 14 by appropriately selecting and combining the external upper case 16 and the built-in upper case 18. It thus becomes possible to reduce the number of parts, which can in turn reduce the manufacturing costs and facilitate parts management. In a case where the external electronic control unit 50 is adopted, the external electronic control unit 50 is attached with ease by selecting the external upper case 16. Meanwhile, in a case where the built-in electronic control unit 52 is adopted, the number of parts, such as connectors, can be reduced by soldering the built-in electronic control unit 52 to the electronic control unit connecting tabs 32 using the built-in upper case 18. Hence, an electronic control unit can be attached to an electric junction box suitably according to the adoption methods of electronic control units.

For example, when the external type is adopted, it becomes possible to obtain electronic control units in a desired country. Also, when the built-in type is adopted, it becomes possible to put electronic control units and electric junction boxes together in the same location. Consequently, by arbitrarily selecting an electronic control unit of the external type, or the built-in type, according to the location where the electronic control unit-mounting electric junction box is to be assembled, the transportation costs and the manufacturing tact time can be reduced.

Figure 4A:
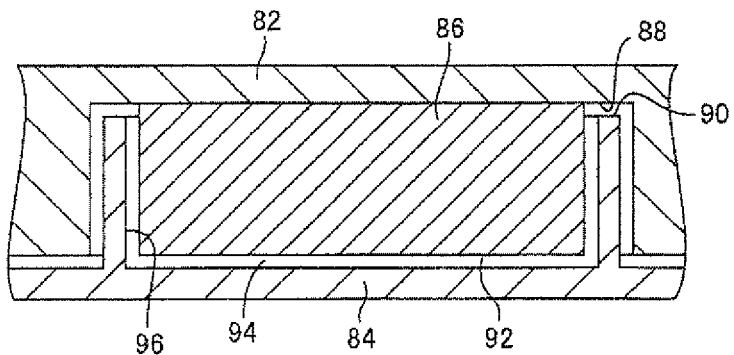
FIGS. 4A-4C are explanatory cross sections used to describe a molding method of the external upper case and the built-in upper case.
Figure 4B:
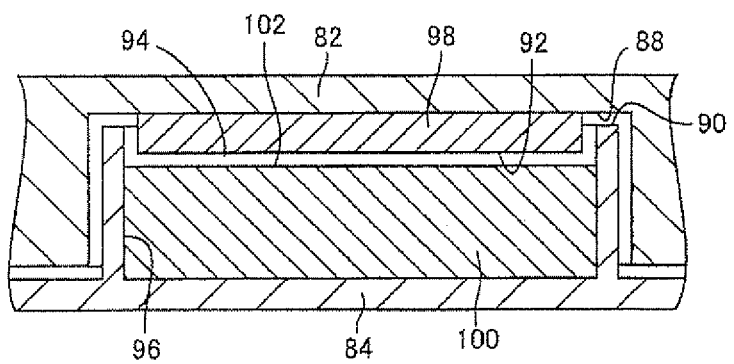
Figure 4C:
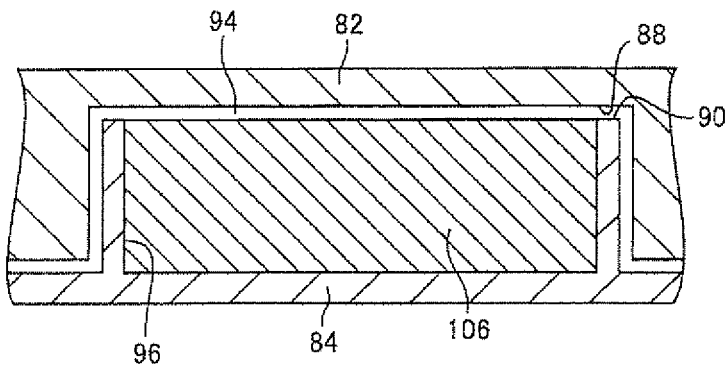

The external upper case 16 and the built-in upper case 18 can be suitably molded by injection molding or the like using, for example, a molding die whose molding section of the recessed containing section 42 is schematically shown in FIGS. 4A-4C. Firstly, in a case where the external upper case 16 is molded, as is schematically shown in FIG. 4A, an upper base die 82 and a lower base die 84 as a base molding die and an upper insert die 86 as an insert die are used. A molding surface 88 corresponding to a top surface shape of the external upper case 16 except for the recessed containing section 42 is formed in the upper base die 82. Meanwhile, a molding surface 90 corresponding to a bottom surface shape of the external upper case 16 except for the recessed containing section 42 is formed in the lower base die 84.

Further, the upper insert die 86 is attached to the molding section of the recessed containing section 42 in the upper base die 82 in a re-attachable manner. A molding surface 92 corresponding to an inner surface shape of the recessed containing section 42 is formed in the upper insert die 86. A depth dimension of the recessed containing section 42 is set according to a height dimension (the dimension in the top-bottom direction of FIGS. 4A-4C) of the upper insert die 86.

As the upper base die 82 put together with the upper insert die 86 and the lower base die 84 are closed by each other, a molding cavity 94 of a shape corresponding to the external upper case 16 is defined between the molding surface 88 of the upper base die 82 and the molding surface 90 of the lower base die 84. The upper insert die 86 goes into a recessed section 96 formed in the molding surface 90 of the lower base die 84 in a section corresponding to the recessed containing section 42 and a shape corresponding to the bottom wall 46 of the recessed containing section 42 is formed between the molding surface 92 of the upper insert die 86 and the recessed section 96 of the lower base die 84. The external upper case 16 is molded by opening the upper base die 82 and the lower base die 84 after a plastic molding material is filled in the molding cavity 94 and allowed to cool and solidify.

Meanwhile, in a case where the built-in upper case 18 is molded, as is schematically shown in FIG. 4B, an upper base die 82 and a lower base die 84 as a base molding die and an upper insert die 98 and a lower insert die 100 as an insert die are used. The upper base die 82 and the lower base die 84 used herein are the same as those used when molding the external upper case 16.

Further, a height dimension of the upper insert die 98 is smaller than that of the upper insert die 86 used when molding the external upper case 16. The lower insert die 100 is attached to the lower base die 84 in a re-attachable manner and a molding surface 102 corresponding to a shape of the inner surface of the built-in upper case 18 in the recessed containing section 42 is formed therein. The bottom surface position of the recessed section 96 is raised as the lower insert die 100 is fit in the recessed section 96.

Accordingly, as the upper base die 82 put together with the upper insert die 98 and the lower base die 84 put together with the lower insert die 100 are closed by each other, a molding cavity 94 of a shape corresponding to the built-in upper case 18 is defined. As the bottom surface position of the recessed section 96 is raised by the lower insert die 100, the built-in upper case 18 having the bottom wall 46 at a position raised higher than that of the external upper case 16 is molded. By preparing a plurality of the upper insert dies 98 and the lower insert dies 100 having different height dimensions and using appropriately selected ones, it becomes possible to adjust the raising of the bottom wall 46.

According to the manufacturing method as above, a plurality of the external upper cases 16 and the built-in upper cases 18 having the bottom walls 46 raised differently can be molded using the standardized upper base die 82 and lower base die 84. Consequently, not only can the manufacturing costs be reduced, but also molding dies can be managed more easily.

By adjusting the height dimensions of the upper insert die 98 and the lower insert die 100, the raising of the bottom wall 46 can be adjusted with ease. Accordingly, as is schematically shown in FIG. 4C, it becomes possible to raise the bottom wall 46 to a position as high as the upper end face of the peripheral wall 44 using a lower insert die 106 alone that fully fills the recessed section 96.

Figure 5:
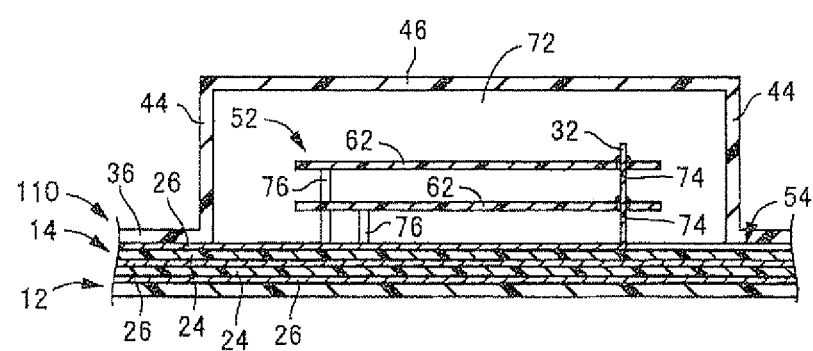
FIG. 5 is an explanatory cross section used to describe an exemplary embodiment of the built-in upper case.

In the exemplary embodiments, a plurality of upper cases may be prepared as the need arises by setting the raising of the bottom wall 46 to several steps. Further, the number of printed-wiring boards to be contained in the built-in upper case is not particularly limited. For example, as is shown in FIG. 5, a plurality of printed-wiring boards 62 may be contained in the containing void 72 using a built-in upper case 110 whose bottom wall 46 is raised to a position substantially as high as the upper end face of the peripheral wall 44. The built-in upper case 110 can be molded advantageously using the lower insert die 106 shown in FIG. 4C. Herein, the electronic control unit is attached on the side of the upper case. However, the electronic control unit may be attached on the side of the lower case and an external lower case and a built-in lower case are molded in such a case.

Further, the above exemplary embodiments describe a fuse box as an example of the electric junction box. However, it should be appreciated that the exemplary embodiments are also applicable to, for example, a relay box, a junction box and the like.

The foregoing descriptions of specific exemplary embodiments have been presented for purposes of illustration and description. They are not intended to be exhaustive or to limit the disclosure to the precise forms disclosed, and obviously many modifications and variations are possible in light of the above teaching. It is understood that various omissions and substitutions of equivalents are contemplated as circumstances may suggest or render expedient, but these are intended to cover the application or implementation without departing from the spirit or scope of the claims.

The invention claimed is:

1. An electronic control unit-mounting electric junction box comprising:
    an electric junction box main body including:
        a casing including a lower case and an upper case having an outer surface, the casing formed by the lower case and the upper case, and
        a conducting path formed in the casing; and
    an electronic control unit attached to the electric junction box main body, the electronic control unit being connected to the conducting path in the electric junction box main body, wherein
    the upper case is either an external upper case or a built-in upper case, and the electronic control unit is either an external control unit or a built-in control unit, and is structured to be attachable to either the external upper case or the built-in upper case, respectively,
    the external upper case is provided with an attachment space configured to accept the external electronic control unit in a first recessed containing section formed in the outer surface of the external upper case, the first recessed containing section having a first bottom wall and a first depth,
    the built-in upper case includes an internal attachment space configured to accept the built-in electronic control unit and defined by a second recessed containing section, the second recessed containing section being defined by a second bottom wall and having a depth smaller than the depth of the first recessed containing section,
    the external electronic control unit in the external upper case is contained in a housing and the lower case and the conducting path are configured to be combined with the external upper case, and
    the built-in electronic control unit in the built-in upper case does not include the housing and the lower case and the conducting path are configured to be combined with the built-in upper case.

2. The electronic control unit-mounting electric junction box according to claim 1, wherein:
    the external upper case is manufactured using a base molding die and a first insert die, and the built-in upper case is manufactured using the base molding die and a second insert die,
    the first insert die and the second insert die are configured to mold a molding section of the first bottom wall of the first recessed containing section in the base molding die and a molding section of the second bottom wall of the second recessed containing section in the based molding die, respectively, and
    the depth of the first recessed containing section and the depth of the second recessed containing section are set by respectively selecting the first and second insert dies.

3. The electronic control unit-mounting electric junction box according to claim 2, wherein:
    the first insert die has a first height and the second insert die has a second insert die, and
    the first height is greater than the second height.

* * * * *